United States Patent
Kim et al.

(10) Patent No.: US 8,973,413 B2
(45) Date of Patent: Mar. 10, 2015

(54) LAUNDRY REFRESHER UNIT AND LAUNDRY TREATING APPARATUS HAVING THE SAME

(75) Inventors: Young Soo Kim, Gyeongsangnam-do (KR); Seong Hae Jeong, Gyeongsangnam-do (KR)

(73) Assignee: LG Electronics Inc., Seoul (KR)

( * ) Notice: Subject to any disclaimer, the term of this patent is extended or adjusted under 35 U.S.C. 154(b) by 1504 days.

(21) Appl. No.: 12/308,982

(22) PCT Filed: Jul. 3, 2007

(86) PCT No.: PCT/KR2007/003224
§ 371 (c)(1),
(2), (4) Date: Apr. 9, 2010

(87) PCT Pub. No.: WO2008/004803
PCT Pub. Date: Jan. 10, 2008

(65) Prior Publication Data
US 2010/0186464 A1    Jul. 29, 2010

(30) Foreign Application Priority Data
Jul. 4, 2006    (KR) .......................... 10-2006-0062474

(51) Int. Cl.
*D06F 73/02*    (2006.01)
*D06F 73/00*    (2006.01)
*H04N 21/234*   (2011.01)
(Continued)

(52) U.S. Cl.
CPC ................ *D06F 73/02* (2013.01); *D06F 73/00* (2013.01); *H04N 21/23412* (2013.01); *H04N 21/2365* (2013.01); *H04N 21/4347* (2013.01); *H04N 21/44012* (2013.01); *H04N 21/8541* (2013.01)

USPC ............................................. 68/5 C; 38/1 A (58) Field of Classification Search
CPC ......... D06F 73/02; D06F 73/00; D06F 58/12; D06F 58/203
USPC ......... 68/5 R, 5 C; 34/491, 565, 218; 38/1 A, 38/1 R, 14
See application file for complete search history.

(56) References Cited

U.S. PATENT DOCUMENTS

| 5,305,484 A | 4/1994 | Fitzpatrick et al. |
| 5,815,961 A * | 10/1998 | Estes et al. ........................ 38/14 |

(Continued)

FOREIGN PATENT DOCUMENTS

| EP | 1 550 829 A1 | 7/2005 |
| JP | 10-305192 A | 11/1998 |

(Continued)

*Primary Examiner* — Joseph L Perrin
(74) *Attorney, Agent, or Firm* — McKenna Long & Aldridge LLP (57) ABSTRACT

The present invention relates to a laundry refresher unit that can selectively supply various types of dry air as well as steam to laundry, and a laundry treating apparatus having the laundry refresher unit. A laundry refresher unit includes a cabinet that defines an exterior thereof, wherein an air path is formed in the cabinet; a steam generator provided in the cabinet to selectively supply steam outside the cabinet through a steam outlet; and a heated air supply device provided in the cabinet to heat air drawn through an air inlet, such that the air having at least three temperature ranges is supplied outside the cabinet through the air outlet. A laundry treating apparatus includes a laundry refresher unit that includes a cabinet, a steam generator and a heated air supply device.

20 Claims, 6 Drawing Sheets

(51) Int. Cl.
*H04N 21/2365* (2011.01)
*H04N 21/434* (2011.01)
*H04N 21/44* (2011.01)
*H04N 21/8541* (2011.01)

(56) References Cited

U.S. PATENT DOCUMENTS

6,189,346 B1    2/2001  Chen et al.
6,425,192 B2 *  7/2002  Arrieta et al. .................... 34/486
6,427,365 B2 *  8/2002  MacGregor et al. ............ 38/1 A
2005/0115120 A1 *  6/2005  Cevik ................................ 38/14
2005/0278972 A1   12/2005  Maruca
2006/0096331 A1    5/2006  Kim
2006/0101867 A1    5/2006  Kleker

FOREIGN PATENT DOCUMENTS

JP    2001-353398        12/2001
KR    10-0444005 B1      11/2004
KR    10-2006-0095293 A   8/2006
WO    WO 03/074778        9/2003

* cited by examiner

LAUNDRY REFRESHER UNIT AND LAUNDRY TREATING APPARATUS HAVING THE SAME

This application is a 35 U.S.C. §371 National Stage entry of International Application No. PCT/KR2007/003224, filed on Jul. 3, 2007, and claims priority to Korean Application No. KR 10-2006-062474, filed on Jul. 4, 2006, both of which are hereby incorporated by reference in their entireties.

TECHNICAL FIELD

The present invention relates to a laundry refresher unit and a laundry treating apparatus having the same. More particularly, the present invention relates to a laundry refresher unit that can change a predetermined laundry storage space into a laundry refresher and that selectively supply various types of dry air as well as steam to laundry, and a laundry treating apparatus having the laundry refresher unit.

BACKGROUND ART

Laundry refreshers are appliances for refreshing laundry more pleasantly and freshly. Specifically, laundry refreshers have functions of supplying fragrance to laundry, preventing static electricity of laundry and removing wrinkles of laundry. Such laundry refreshers are consumed a lot in North America.

A cabinet is provided in a conventional laundry refresher and a predetermined space in which laundry is held is formed in the cabinet. Steam is supplied to the space to remove wrinkles of laundry. A steam supply source is provided in the cabinet and the steam supply source may be a steam generator that generates steam or an external boiler.

In addition, heated air is supplied to the conventional refresher and a heated air supply source may be provided in the cabinet or may be an auxiliary external source.

The conventional laundry refresher may be categorized, based on a method of heating air, into a gas burner type laundry refresher and an electric heater type laundry refresher. There is limitation of controlling temperature ranges of heated air in both air heating methods.

Furthermore, heated air of the conventional laundry refreshers is high temperature and it results in laundry fabric deformation, because delicate fabrics such as wool and silk are subject to be deformed by high temperatures. As a result, such conventional laundry refreshers have limitations of refreshing laundry weaved by above wool or silk.

A still further, according to the conventional laundry refresher, a steam supply device or a heated air supply device is provided in the cabinet as one cabinet. As a result, a user should purchase a cabinet, a steam supply device and a heated air supply device to purchase one laundry refresher, which results in high price of the product.

DISCLOSURE OF INVENTION

Technical Problem

The heated air of the conventional laundry refreshers is high temperature and it results in laundry fabric deformation, because delicate fabrics such as wool and silk are subject to be deformed by high temperatures. As a result, such conventional laundry refreshers have limitations of refreshing laundry weaved by above wool or silk.

Furthermore, according to the conventional laundry refresher, a steam supply device or a heated air supply device is provided in the cabinet as one cabinet. As a result, a user should purchase a cabinet, a steam supply device and a heated air supply device to purchase one laundry refresher, which results in high price of the product.

Technical Solution

To solve the problems, an object of the present invention is to provide a laundry refresher unit that is convenient to install and use. As a result, a laundry treating apparatus having low production and installation cost may be provided.

Another object of the present invention is to provide a convenient laundry refresher that can be change an existing closet or cabinet into a laundry treating apparatus capable of refreshing easily. As a result, the maintenance cost of the laundry refresher can relatively low.

To achieve these objects and other advantages and in accordance with the purpose of the invention, as embodied and broadly described herein, a laundry refresher unit includes a cabinet that defines an exterior thereof, wherein an air path is formed in the cabinet; a steam generator provided in the cabinet to selectively supply steam outside the cabinet through a steam cutlet; and a heated air supply device provided in the cabinet to heat air drawn through an air inlet, such that the air having at least three temperature ranges is supplied outside the cabinet through the air cutlet.

Here, the heated air supply device selectively supplies room temperature air, middle temperature air or high temperature air outside the cabinet. In case of supplying the middle air, middle temperature heated air or middle temperature dry heated air is selectively supplied outside the cabinet. In case of supplying the high temperature air, high temperature dry heated air is supplied outside the cabinet.

The heated air supply device may include a housing in which an air path is formed to connect the air inlet and the air cutlet; a condensation type heat pump provided along the housing; and a heater that heats air flowing along the air path.

Here, the condensation type heat pimp is configured of a compressor, a condenser, an expansion valve and an evaporator in which refrigerant is circulated, and the evaporator and the condenser are heat-exchanged with the air flowing along the path. The moisture contained in the air drawn at the evaporator is condensed and removed in the condensation type heat pimp, and the air drawn at the condenser is heated to a predetermined middle temperature in the condensation type heat pump.

The condensation type heat pimp may further include a condensed water box in which water condensed at the evaporator is collected. It is preferable that the water collected in the condensed water box is supplied to the steam generator.

When supplying heated air outside the cabinet, the air drawn into the housing is heated by at least one of the condensation type heat pimp and the heater to be supplied outside the cabinet. When supplying middle temperature heated air outside the cabinet, the heated air supply device operates the heater. When supplying middle temperature dry heated air outside the cabinet, the heated air supply device operates the condensation type heat pump. When supplying high temperature dry heated air outside the cabinet, the heated air supply device operates the condensation type heat pump and the heater simultaneously.

The heated air supply device according to the present invention may further include a fan that allows air to flow along the air path. The fan may be provided at a rear end of the condenser. Here, the fan is operated, when room temperature air is supplied outside the cabinet.

The laundry refresher unit may further include a control panel provided at a predetermined portion of the cabinet to control the steam generator and the heated air supply device.

In another aspect of the present invention, a laundry treating apparatus includes a laundry refresher unit comprising: a cabinet that defines an exterior thereof, wherein an air path is formed in the cabinet; a steam generator provided in the cabinet to selectively supply steam outside the cabinet through a steam outlet; and a heated air supply device provided in the cabinet to heat air drawn through an air inlet, such that the air having at least three temperature ranges is supplied outside the cabinet through the air inlet.

Here, it is preferable that the laundry refresher unit that is separable is secured to a predetermined portion of the laundry treating apparatus.

The laundry treating apparatus is configured of a cabinet having an inner space in which laundry is held. The laundry refresher unit may selectively supply heated air to the inner space. The laundry refresher unit may further selectively supply steam into the inner space.

It is preferable that the laundry refresher unit is positioned at a lower portion of the inner space.

Advantageous Effects

According to the present invention, a laundry refresher unit that can supply heated air having various temperature ranges may be provided.

Furthermore, a refresher unit that can refresh laundry by supplying heated air as well as steam may be provided.

A still further, a refresher unit that can be usable to particular fabric clothes, be usable regardless of any kind fabric clothes.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference lumbers will be used throughout the drawings to refer to the same or like parts.

In reference to FIG. 1, a laundry refresher unit according to the present invention will be explained in detail.

Figure 1A:
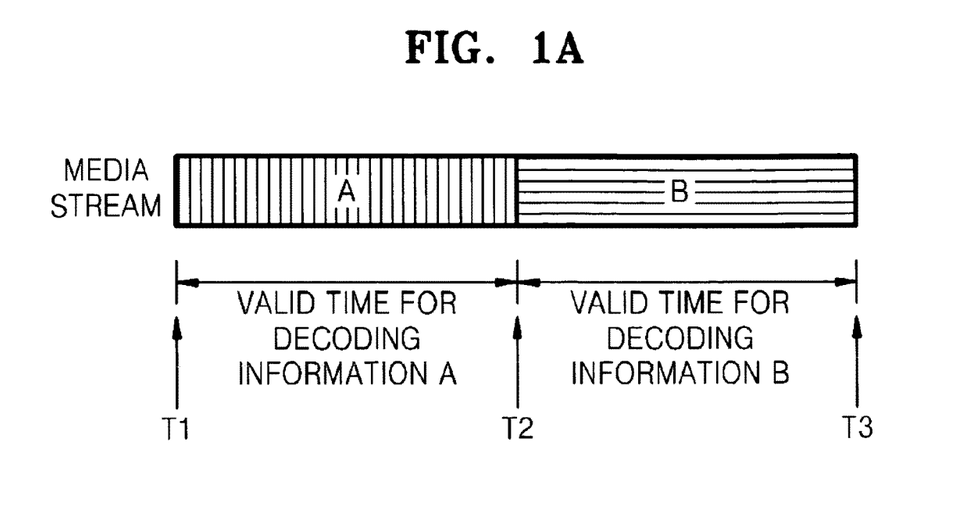
FIG. 1 is a perspective view illustrating a laundry refresher according to the present invention.
Figure 1B:
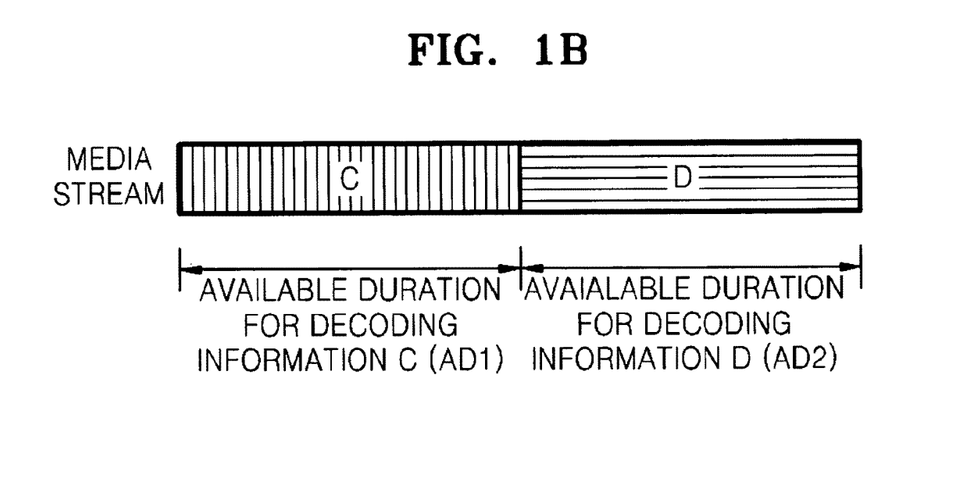
Figure 1C:
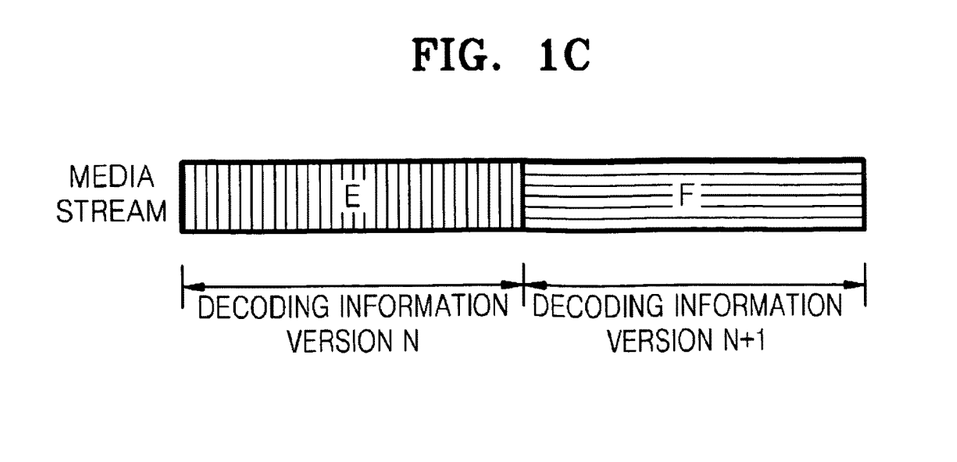

FIG. 1 is a perspective view schematically illustrating the laundry refresher unit according to the present invention. As shown in FIG. 1, the laundry refresher unit includes a cabinet 10, a steam generator 20 and a heated air supply device 40 (see FIG. 3).

The steam generator 20 and the heated air supply device 40 are provided in the cabinet 10. As a result, the laundry refresher unit according to the present invention may be portable and may be detachably secured in a predetermined inner space of the cabinet 10.

An air outlet 11 and an air inlet 12 are provided in the cabinet 10. Air is discharged through the air cutlet 11 and air is drawn through the air inlet 12. As a result, once air is supplied outside the cabinet 10 through the air cutlet 11, air is drawn into the cabinet 10 through the air inlet 12.

Specifically, the air passing through the air inlet 12 is drawn into the heated air supply device 40 provided in the cabinet 10 and thus the air is discharged outside through the air outlet 11.

In addition, a steam spray hole 13 is provided at the cabinet 10. Steam generated at the steam generator 20 provided in the cabinet 10 is sprayed outside the cabinet through the steam spray hole 13.

A control panel 14 may be provided at a front surface of the cabinet 10 to control laundry refreshing.

As shown in FIG. 1, the control panel 14 may be provided at an upper surface of the cabinet 10 and the air inlet 12 may be provided at a side surface of the cabinet 10 as necessary.

Next, in reference to FIG. 2, a condensation type heat pump 50 of the heated air supply device 40 according to the present invention will be explained.

Figure 2:
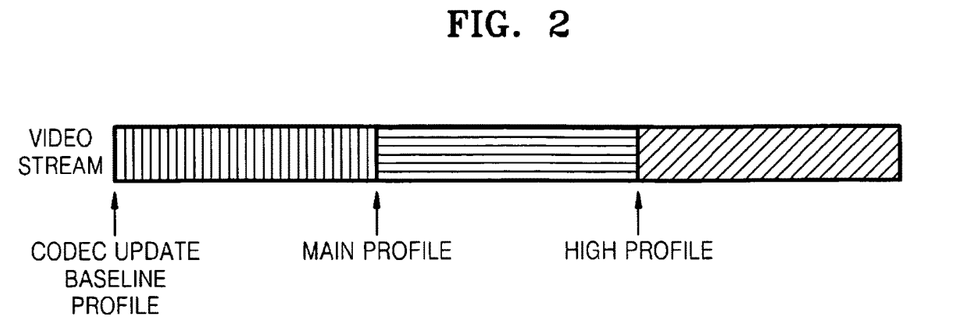
FIG. 2 is diagram schematically illustrating a condensation type heat pump cycle applicable to the present invention.

FIG. 2 illustrates a refrigerant cycle of the condensation type heat pump 50.

The present invention is configured of the condensation type heat pimp 50. This condensation type heat pump 50 has a refrigerant cycle, as shown in FIG. 2. Such refrigerant cycle is identical to a refrigerant cycle that is applied to a conventional heat pimp or an air conditioner.

The condensation type heat pump 50 is provided in the cabinet 10.

The condensation type heat pump 50 is configured of a compressor 51, a condenser 52, an expansion valve 53 and an evaporator 54, which are connected by a refrigerant path 55. Refrigerant is passing through the refrigerant path and the refrigerant is heat-exchanged with nearby air by changes of refrigerant pressure, refrigerant temperatures and phase changes.

More specifically, high temperature/low pressure gaseous refrigerant evaporated at the evaporator 54 is drawn in the compressor 51 to be compressed. Hence, high temperature/high pressure gaseous refrigerant is drawn in the condenser 52. The gaseous refrigerant is condensed into liquid refrigerant which is be low temperature/high pressure refrigerant. At this time, as the refrigerant is condensed, heat of the refrigerant is radiated outside. The low temperature/high pressure liquid refrigerant condensed at the condenser 52 is flowing into the expansion valve 53 to be low temperature/low pressure liquid refrigerant. Hence, the low temperature/low pressure liquid refrigerant is flowing into the evaporator 54. At this time, the liquid refrigerant absorbs nearby heat and it is changed into high temperature/low pressure gaseous refrigerant.

Next, the heated air supply device 40 provided in the present invention that uses the above condensation type heat pump will be explained.

Figure 3:
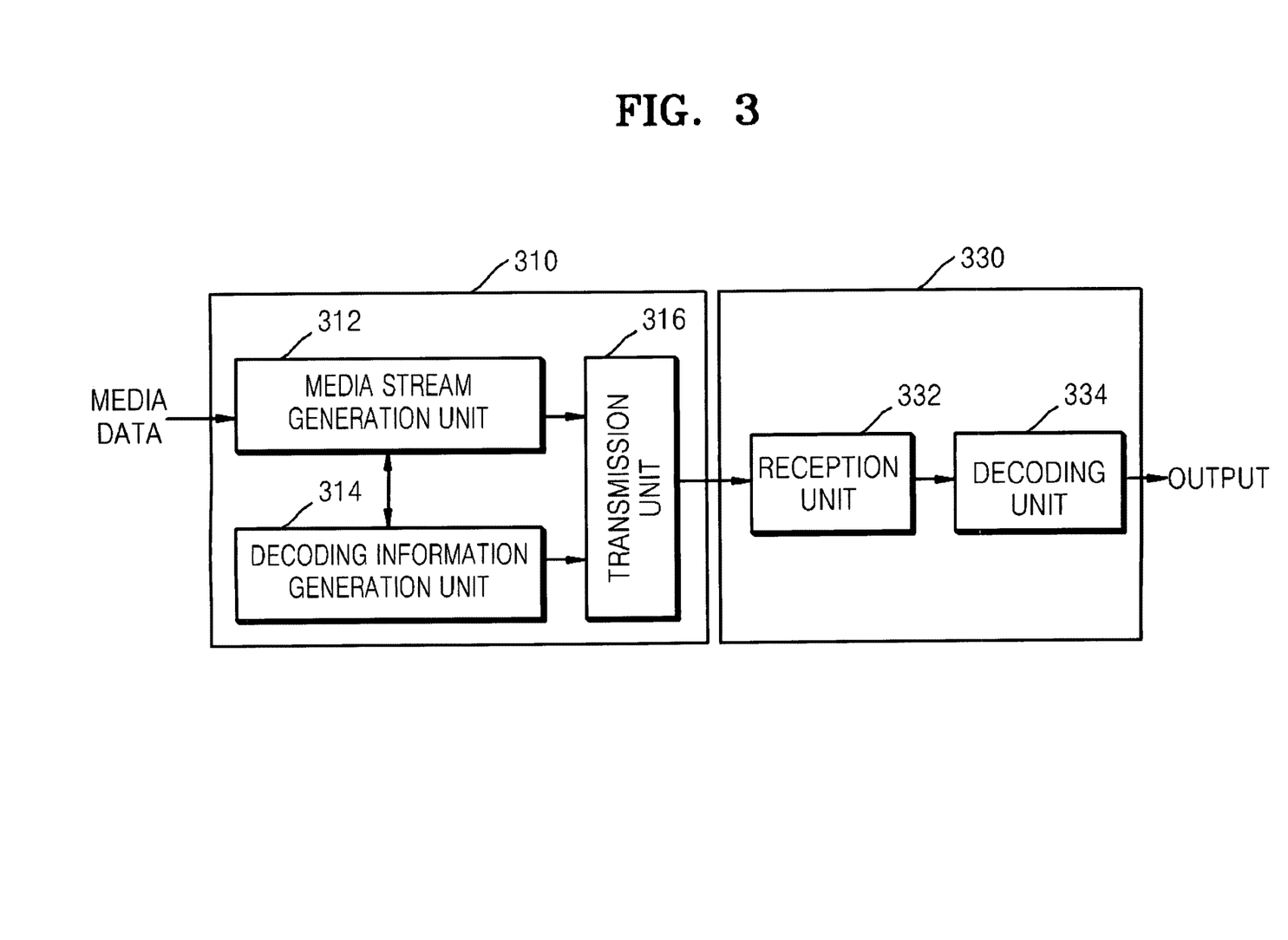
FIG. 3 is a sectional view schematically illustrating a heated air supply device applicable to the present invention.

FIG. 3 is a sectional view schematically illustrating the heated air supply device according to the present invention. This heated air supply device is provided in the cabinet 10 shown in FIG. 1.

FIG. 3 shows the evaporator 54 and the condenser 52 cut of the configurations of the condensation type heat pump 50. The evaporator 54 and the condenser 52 are connected by the refrigerant path 55, as shown in FIG. 1, as well as to the expansion valve 53 and the compressor 51.

As shown in FIG. 3, an air path 45 is formed in the heated air supply device 40. That is, air drawn thorough an air inlet 43 passes the air path 45 and is discharged through an air cutlet 41.

Here, the air inlet 43 may be the air inlet 12 formed in the cabinet 10 or it may be in communication with the air inlet 12 by an auxiliary path. Also, the air outlet 41 may be the air outlet 11 formed in the cabinet 10 or it may be in communication with the air outlet 11 by an auxiliary path.

The evaporator 54 and the condenser 52 are provided in the air path 45. A fan 48 and a heater 49 may be further provided in the air path 45.

The position of the fan 48 is not limited to a particular portion of the air path 45.

However, it is preferable that the fan 48 and the heater 49 are provided between the condenser 52 and the air cutlet 41 to improve air inflow efficiency. It is also preferable that the heater 49 is provided between the fan 48 and the air cutlet 41.

By using such heated air supply device 40, various temperature ranges of air may be supplied outside the cabinet 10.

First of all, if only the fan 48 of the heated air supply device 48 is operated, room temperature air may be supplied outside the cabinet. That is, after only the room temperature air is supplied outside, the room temperature air is re-drawn into the heated air supply device 40.

If only the fan 48 and the heater 49 are operated cut of the configurations of the heated air supply device 48, middle temperature air that is relatively higher than the room temperature air may be supplied outside the cabinet. Here, the heater 49 may be a heater having a substantially smaller capacity than one provided in a conventional dryer.

Here, it is preferable that the middle temperature is 50~75° C. Thus, the capacity of the heater 49 may be large enough to heat the middle temperature air, considering the capacity of the fan 48.

However, in this case, it is possible to supply the middle temperature air and it is difficult to remove moisture contained in the air and to supply dry heated air. That is because another means does not have to be operated to remove the moisture.

Thus, if only the fan 48 and the condensation heat pump 50 are operated, it is possible to heat the middle temperature dry heated air. Hereinafter, the heated air having its moisture removed by the heat pump will be called as dry heated air to be distinguished from the air not having the moisture removed.

That is, as the heat pump 50 is operated, the air passes the condenser 52 and it is heated. This is because the air is heated by heat-changing with nearby air at the condenser 52.

The temperature of the air having passed the condenser 52 is relatively lower than heated air of a conventional electric heater type laundry refresher unit or gas burner type laundry refresher unit. That is, it is possible to get the heated air at the temperature of 50~75° C.

If the air is heated by using such heat pump, it is possible to improve the air heat efficiency twice as much as that of the electric heater type laundry refresher unit. This is because the heat-exchanged efficiency between a heating source and air is higher in the heat pump than the electric burner.

If the heat pimp 50 and the fan 48 are operated, it is possible to remove the moisture contained in the air and to supply the dry heated air without any auxiliary condensing means for condensing the moisture. That is, the evaporator 54 configured of the condensation type heat pimp 50 may be employed to perform such a function of moisture removal.

The predetermined temperature air can contain a limited amount of steam. The lower is the temperature of the air, the smaller is the saturated water vapor amount. As a result, lowering the temperature of the air makes it possible to remove the moisture of the air.

In the meantime, the evaporator 54 absorbs heat from nearby air and thus the air drawn in the evaporator 54 emits its heat, such that the temperature of the air is lowered. In this case, the moisture contained in the air is condensed and removed.

As a result, an auxiliary means for moisture removal does not have to be provided, because of the above configuration of the condensation type heat pump 50.

Thus, such heated air supply type laundry refresher unit has following effects, compared to the gas type or electric heater type laundry refresher unit.

First, basically, the gas type generates heat, combusting gas and it is necessary to supply oxygen. That is, carbon dioxide and carbon monoxide are generated by combustion between oxygen and gas. As a result, external oxygen should be drawn continuously and carbon dioxide should be discharged continuously in the gas type, which results in a problem that it is impossible to supply heated air in air circulation.

Thus, such gas type heated air supply method is not appropriate for indoor.

If an electric heater is used, air may be supplied in air circulation. However, as mentioned above, if heated air is supplied by only the electric heater, an auxiliary means for removing the moisture contained in the air should be provided. This kind of moisture removal means may be water-cooled type or air-cooled type.

However, the water-cooled moisture removal means should be connected with an auxiliary water tap and it is not preferable that another connection means between the moisture removal means and the water tap should be provided only to remove the moisture, as a matter of production cost or efficiency. Moreover, there night be a problem that the above connection of the water tap is not easy according to a place where a laundry treating apparatus is installed.

The air-cooled moisture removal means should draw external air and discharge the air. In this case, the external air is used only for cooling, unlike the gas type, and thus the air need not be outdoor air.

However, even in the air-cooled moisture removal means, an auxiliary duct and a fan should be provided to draw and discharge air, which is not preferable as a matter of production cost and efficiency.

In contrast, if heated air is supplied by the condensation type heat pump, an auxiliary moisture removal means is not necessary. This is efficient as a matter of energy, compared with the gas type or electric heater type.

In addition, it is possible to save work required for the auxiliary duct installation. As a result, the laundry refresher according to the present invention can be portable and it can perform a function of laundry refreshing without any auxiliary devices.

Lastly, it is possible according to the present invention to supply high temperature heated air outside the cabinet 10.

For that, all of the condensation type heat pump 50, the fan 48 and the heater 49 configured of the heated air supply device 40 according to the present invention are operated.

Specifically, the dry heated air heated at the middle temperature by the condenser 53 of the condensation type heat pump 50 is heated again and changed into high temperature dry heated air by the heater 49. Here, it is preferable that the high temperature is a temperature higher than 90° C. and it is also preferable that the high temperature is a temperature of higher than 100° C.

The heater according to the present invention is employed for heightening the temperature of the middle temperature air to the high temperature. As a result, the heater according to the present invention results in economic energy consumption, compared with the conventional heater used to heighten the temperature of the room temperature air to the high temperature air.

On the other hand, the laundry refresher unit according to the present invention further includes a steam generator 20 for supplying steam. The steam generator 20 is provided in the cabinet 10 to supply steam outside the cabinet 10. Here, the steam may be water vapor and it is preferable that steam generated by boiling water, having higher than a predetermined temperature.

The steam generator 20 may inject steam outside the cabinet 10 through a steam injection hole 21. The steam generator 20 may include a water box (not shown) that holds water for steam generation. The water box may be connected with an external water tap, or a user may fill the water box with water directly.

At this time, the water condensed at the condenser 52, which is mentioned above, may be supplied to the water box (not shown).

In addition, a heater (not shown) is provided in the steam generator 20 to boil water and generate steam. This heater may be a sheath heater.

The reason why the steam is supplied to the laundry is to refresh the laundry. That is, it is efficient to remove bad smell, static electricity and wrinkles of the laundry. In addition, an effect of laundry sterilization may be gained.

In the meantime, the heated air according to the present invention does not have to be supplied in communication with the steam. Especially, if the laundry is dried in a humid weather, laundry refreshing may be performed by supplying only heated air.

Next, in reference to FIG. 4, an embodiment, to which the laundry refresher unit according to the present invention is applied, and an operation of the laundry refresher unit will be described.

Figure 4:
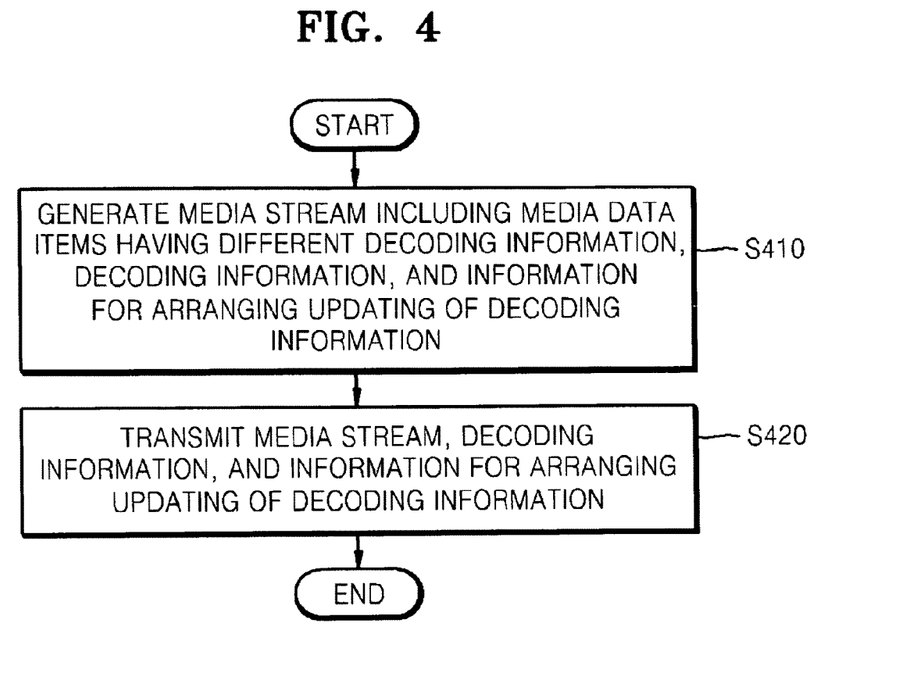
FIG. 4 is a perspective view illustrating an embodiment to which the laundry refresher according to the present invention is applied.
Figure 5:
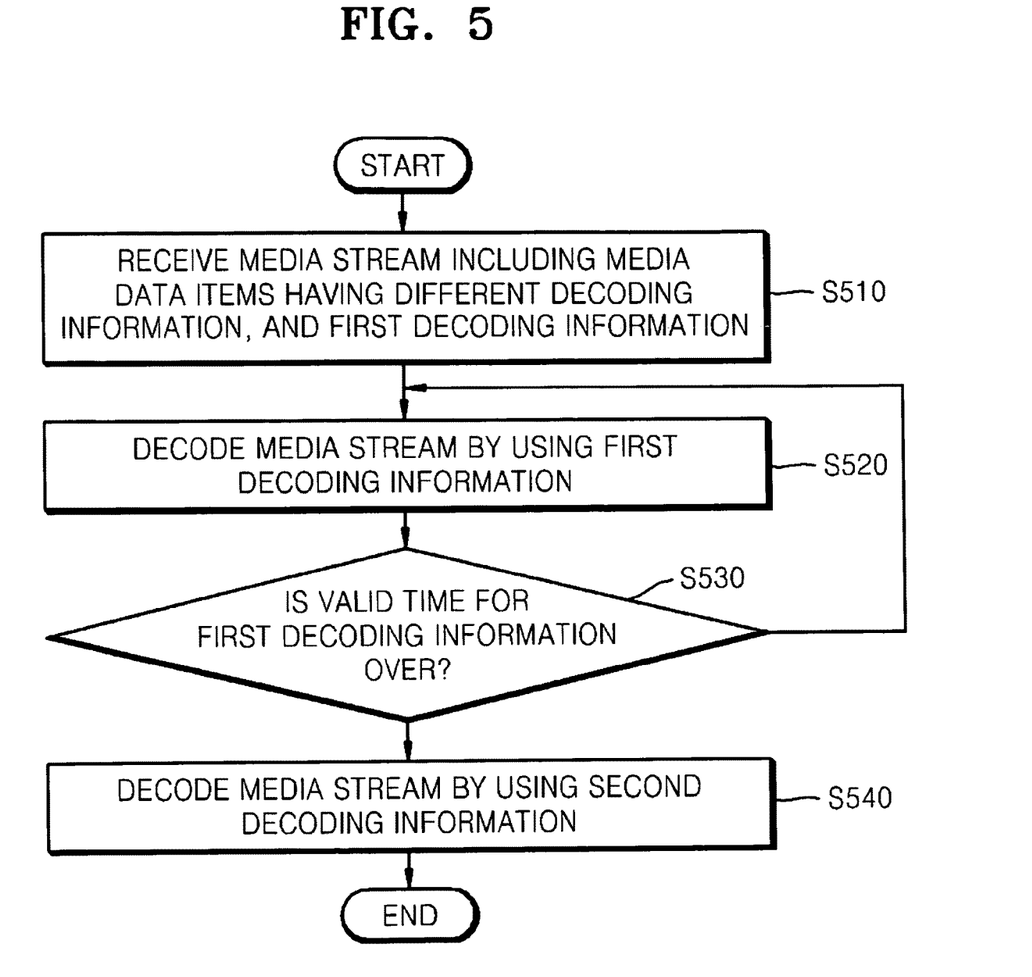
Figure 6:
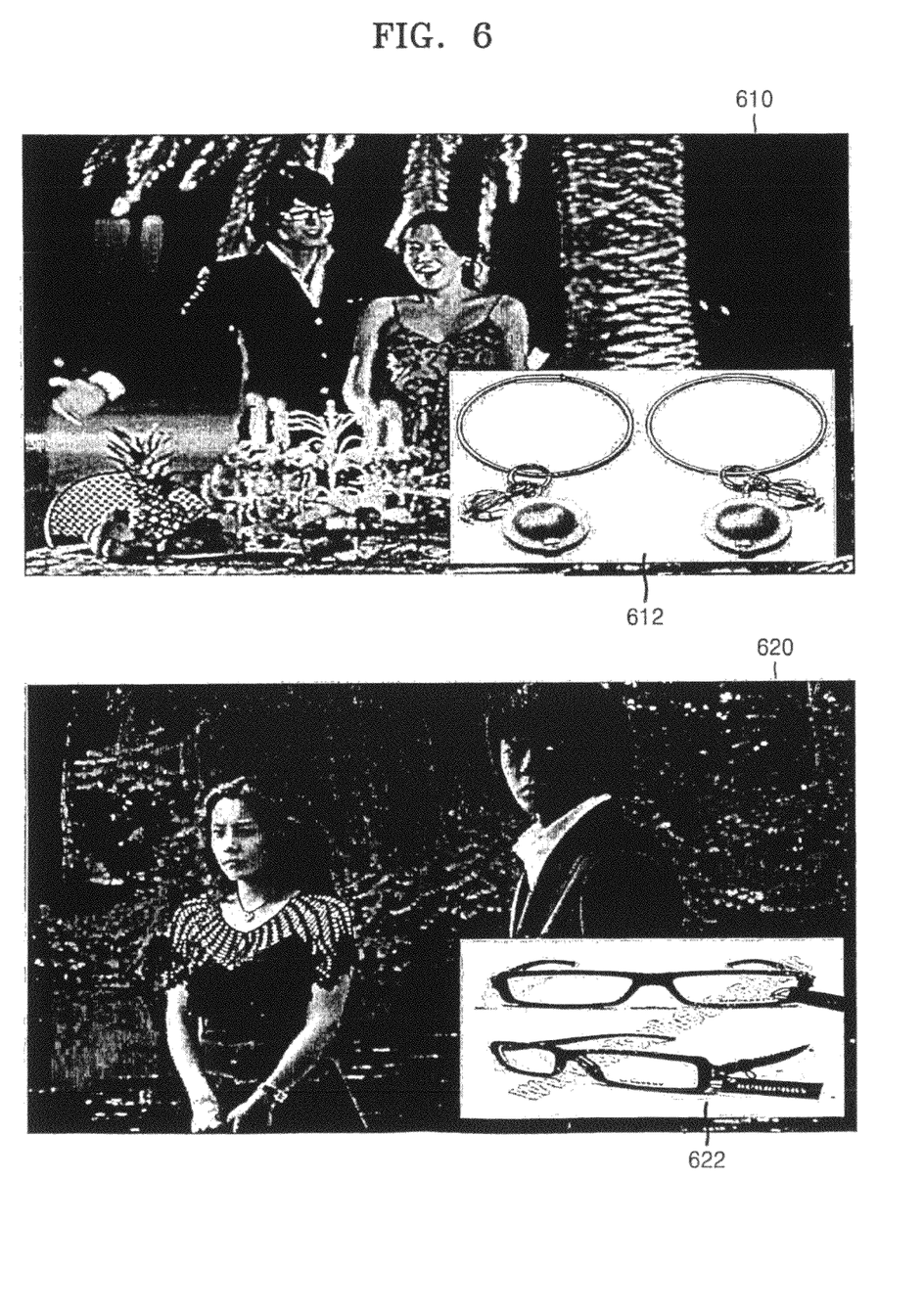

FIG. 4 is a diagram illustrating the laundry refresher unit according to the present invention is provided in the laundry treating apparatus 60.

A door 12 is provided at the laundry treating apparatus 60 to selectively connect an inner space with an outside and laundry is held within the inner space of the laundry treating apparatus 60.

Since the laundry refresher unit 100 according to the present invention is for laundry refreshing, the laundry treating apparatus 60 may be a closet, a cabinet or a dress room, and it is not limited thereto. The laundry refresher unit according to the present invention may be applicable to various kinds of closed spaces where clothes are held.

The laundry treating apparatus is not necessarily closed but it is preferable that the laundry treating apparatus is closed, considering refreshing efficiency.

First, if clothes weaved with delicate fabric such as wool and silk are held in the laundry treating apparatus, steam or middle temperature heated air may be supplied outside the cabinet of the laundry refresher unit to refresh the clothes.

At this time, a user selects whether steam is supplied to the laundry treating apparatus by using the control panel 14, and whether the middle temperature heated air or the middle temperature dry heated air is supplied.

The steam generator is operated by this selection to supply steam to the closet. Hence, the fan and the condensation type heat pump are operated to supply the middle temperature dry heated air inside the closet.

The middle temperature dry heated air supplied to the closet absorbs the moisture contained in the laundry to be damp air, and the damp air is re-supplied to the laundry refresher unit. Hence, the damp air passes the evaporator 54 to remove its moisture and it is heated, passing through the condenser 52. The air is supplied to the closet.

The user can operates the control panel 14 and select to supply the high temperature dry heated air to the closet, which is refreshing clothes weaved with high thermal-resistance, for example, cotton or the like.

The fan 48, the condensation type heat pump 50 and the heater 49 are operated by this selection to supply the high temperature dry heated air to the closet.

As a result, the existing closet or the like is used as laundry treating refresher by using the laundry refresher unit according to the present invention, which results in supplying the laundry refresher with a low production cost.

In the meantime, it is preferable that the laundry treating apparatus having the laundry refresher unit according to the present invention is formed of predetermined material with high thermal-resistance or high moisture-resistance. If the laundry treating apparatus having the laundry refresher unit according to the present invention is formed of wood material, an appropriate coating film may be formed.

According to the present invention, a laundry refresher unit that can supply heated air having various ranges may be provided.

Furthermore, a refresher unit that can refresh laundry by supplying heated air as well as steam may be provided.

A still further, a refresher unit that can be usable to particular fabric clothes, be usable regardless of any kind fabric clothes.

An object of the present invention is to provide a laundry refresher unit that is convenient to install and use. As a result, a laundry treating apparatus having low production and installation cost may be provided.

Another object of the present invention is to provide a convenient laundry refresher that can be change an existing closet or cabinet into a laundry treating apparatus capable of refreshing easily. As a result, the maintenance cost of the laundry refresher can relatively low.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has an industrial applicability.

According to the present invention, a laundry refresher unit that can supply heated air having various ranges may be provided.

Furthermore, a refresher unit that can refresh laundry by supplying heated air as well as steam may be provided.

A still further, a refresher unit that can be usable to particular fabric clothes, be usable regardless of any kind fabric clothes.

The invention claimed is:
1. A laundry refresher unit comprising:
a cabinet that defines an exterior thereof;

a steam generator provided in the cabinet to selectively supply steam outside the cabinet through a steam outlet;

a heated air supply device provided in the cabinet to heat air drawn through an air inlet, the heated air supply device comprising a housing in which an air path is formed to connect the air inlet and an air outlet, a condensation type heat pump provided along the housing, and a heater that heats air flowing along the air path; and a control panel provided at a predetermined portion of the cabinet to control the steam generator and the heated air supply device, such that the air having at least three temperature ranges is supplied outside the cabinet though the air outlet, wherein the cabinet of the laundry refresher unit is portable as a whole such that the cabinet of the laundry refresher unit is detachably secured to a predetermined portion of a variety of laundry treating apparatus having an inner space in which laundry and the laundry refresher united are held, and wherein the air inlet is configured to draw the air from the inner space, the air outlet is configured to supply the air to the inner space and the steam outlet configured to supply the steam to the inner space.

2. The laundry refresher unit of claim 1, wherein the heated air supply device selectively supplies room temperature air, middle temperature air, or high temperature air outside the cabinet, wherein the middle temperature is 50-75° C. and the high temperature is a temperature higher than 90° C.

3. The laundry refresher unit of claim 2, wherein middle temperature heated air or middle temperature dry heated air is selectively supplied outside the cabinet, when the middle air is supplied.

4. The laundry refresher unit of claim 3, wherein high temperature dry heated air is supplied outside the cabinet, when the high temperature air is supplied.

5. The laundry refresher unit of claim 4, wherein the heated air supply device comprises:

a condensation type heat pump provided along the housing; and a heater that heats air flowing along the air path.

6. The laundry refresher unit of claim 5, wherein the condensation type heat pump is configured of a compressor, a condenser, an expansion valve and an evaporator in which refrigerant is circulated, and the evaporator and the condenser are heat-exchanged with the air flowing along the path.

7. The laundry refresher unit of claim 6, wherein the moisture contained in the air drawn at the evaporator is condensed and removed in the condensation type heat pump, and the air drawn at the condenser is heated to a predetermined middle temperature in the condensation type heat pump.

8. The laundry refresher unit of claim 7, wherein the condensation type heat pump further comprises a condensed water box in which water condensed at the evaporator is collected.

9. The laundry refresher unit of claim 8, wherein the water collected in the condensed water box is supplied to the steam generator.

10. The laundry refresher unit of claim 7, wherein the air drawn into the housing is heated by at least one of the condensation type heat pump and the heater to be supplied outside the cabinet, when heated air is supplied outside the cabinet.

11. The laundry refresher unit of claim 10, wherein the heated air supply device operates the heater, when middle temperature heated air is supplied outside the cabinet.

12. The laundry refresher unit of claim 10, wherein the heated air supply device operates the condensation type heat pump, when middle temperature dry heated air is supplied outside the cabinet.

13. The laundry refresher unit of claim 10, wherein the heated air supply device operates the condensation type heat pump and the heater simultaneously, when high temperature dry heated air is supplied outside the cabinet.

14. The laundry refresher unit of claim 5, wherein the heated air supply device further comprises, a fan that allows air to flow along the air path.

15. The laundry refresher unit of claim 14, wherein the fan is provided at a rear end of the condenser.

16. The laundry refresher unit of claim 14, wherein the fan is operated when room temperature air is supplied outside the cabinet.

17. A laundry treating apparatus comprising:

a main cabinet having an inner space in which laundry is held; and a laundry refresher unit comprising:

a cabinet that defines an exterior thereof;

a steam generator provided in the cabinet to selectively supply steam outside the cabinet through a steam outlet;

a heated air supply device provided in the cabinet to heat air drawn through an air inlet, the heated air supply device comprising a housing in which an air path is formed to connect the air inlet and an air outlet;

a condensation type heat pump provided along the housing;

a heater that heats air flowing along the air path; and a control panel provided at a predetermined portion of the cabinet to control the steam generator and the heated air supply device, such that the air having at least three temperature ranges is supplied outside the cabinet though the air outlet, wherein the cabinet of the laundry refresher unit is portable as a whole such that the cabinet of the laundry refresher unit is detachably secured to a predetermined portion of the main cabinet, and wherein the air inlet is configured to draw the air from the inner space, the air outlet is configured to supply the air to the inner space and the steam outlet configured to supply the steam to the inner space.

18. The laundry treating apparatus of claim 17, the laundry refresher unit selectively supplies heated air to the inner space.

19. The laundry treating apparatus of claim 18, wherein the laundry refresher unit further selectively supplies steam into the inner space.

20. The laundry treating apparatus of claim 18, wherein the laundry refresher unit is positioned at a lower portion of the inner space.

* * * * *